US012807268B2

(12) United States Patent
Yu et al.

(10) Patent No.: US 12,807,268 B2
(45) Date of Patent: Nov. 24, 2026

(54) CABLE-ACTUATED HYDRAULIC CONVERSION PUMP, HANDLEBAR, AND TWO-WHEELED VEHICLE

(71) Applicant: LANXI JIEKE SPORTS APPARATUS MANUFACTURING CO., LTD., Jinhua (CN)

(72) Inventors: Zhijun Yu, Jinhua (CN); Sibin Wu, Jinhua (CN); Chengguo Zheng, Jinhua (CN); Yao Cheng, Jinhua (CN)

( * ) Notice: Subject to any disclaimer, the term of this patent is extended or adjusted under 35 U.S.C. 154(b) by 17 days.

(21) Appl. No.: 19/414,157

(22) Filed: Dec. 9, 2025

(65) Prior Publication Data

US 2026/0091844 A1 Apr. 2, 2026

Related U.S. Application Data

(63) Continuation of application No. PCT/CN2025/074475, filed on Jan. 23, 2025.

(30) Foreign Application Priority Data

Jan. 25, 2024 (CN) ........................ 202410103296.3
May 24, 2024 (CN) ........................ 202421168253.5
Aug. 13, 2024 (CN) ........................ 202421947261.X

(51) Int. Cl.
*B62L 3/02* (2006.01)
*B62K 23/06* (2006.01)

(52) U.S. Cl.
CPC .............. *B62L 3/023* (2013.01); *B62K 23/06* (2013.01); *B62L 3/02* (2013.01)

(58) Field of Classification Search
CPC ............ B62L 3/02; B62L 3/023; B62K 23/06
See application file for complete search history.

(56) References Cited

U.S. PATENT DOCUMENTS 7,938,234 B2 * 5/2011 Jinbo .................... B60T 13/588 188/344
8,783,429 B2 * 7/2014 Moore ................... B62K 23/06 188/344

(Continued)

FOREIGN PATENT DOCUMENTS

CN 219325899 7/2013
CN 204623736 9/2015

(Continued)

*Primary Examiner* — Thomas E Lazo
(74) *Attorney, Agent, or Firm* — Daniel M. Cohn

(57) ABSTRACT

A cable-actuated hydraulic conversion pump, a handlebar, and a two-wheeled vehicle are provided. The cable-actuated hydraulic conversion pump includes a pump body, and the pump body is provided with at least one oil cylinder chamber, at least one oil reservoir chamber, a cable-actuated hydraulic brake component, and an oil pressure balancing component. The oil cylinder chamber is formed on the pump body and is communicated to an oil outlet; the oil reservoir chamber is formed on the pump body and is communicated to the oil cylinder chamber, the oil reservoir chamber and the oil cylinder chamber are filled with brake fluid. The cable-actuated hydraulic conversion pump, the brake cable and the brake hose are reduced from being exposed or even completely hidden inside the handle, combining the advantages of the cable-actuated disc brake and the hydraulic disc brake to achieve a smooth braking effect.

9 Claims, 7 Drawing Sheets

(56) References Cited

U.S. PATENT DOCUMENTS

| | | | | | |
|---|---|---|---|---|---|
| 10,407,123 | B2 * | 9/2019 | Chen | ....................... | B62L 3/023 |
| 2013/0240313 | A1 | 9/2013 | Moore | | |
| 2014/0231203 | A1 * | 8/2014 | Chen | ....................... | B62L 3/023 188/344 |

FOREIGN PATENT DOCUMENTS

| | | | | |
|---|---|---|---|---|
| CN | 222202805 | | 12/2024 | |
| EP | 4592170 | A1 * | 7/2025 | ................ B62L 1/02 |

* cited by examiner

CABLE-ACTUATED HYDRAULIC CONVERSION PUMP, HANDLEBAR, AND TWO-WHEELED VEHICLE

CROSS-REFERENCE TO RELATED APPLICATIONS

This application is a continuation of International Application No. PCT/CN2025/074475 with a filing date of Jan. 23, 2025, designating the United States, now pending, and further claims the benefit of priority to the following applications:

Chinese Application No. 202410103296.3 with a filing date of Jan. 25, 2024;

Chinese Application No. 202421168253.5 with a filing date of May 24, 2024;

Chinese Application No. 202421947261.X with a filing date of Aug. 13, 2024.

The content of the aforementioned international application and priority applications, including any intervening amendments thereto, are incorporated herein by reference.

TECHNICAL FIELD

The present disclosure relates to the technical field of vehicle brake accessories, in particular to a cable-actuated hydraulic conversion pump, a handlebar, and a two-wheeled vehicle.

BACKGROUND

The cable-actuated hydraulic disc brake is a novel disc brake that combines cable disc brake and hydraulic disc brake in the current market. It has the advantages of the cable-actuated disc brake and the hydraulic disc brake, with low cost and good braking experience. The key component of the cable-actuated hydraulic disc brake is the cable-actuated hydraulic conversion pump, which is used to convert the cable-actuated force of the cable-actuated brake lever into oil pressure and deliver it to the oil-pressure lower pump.

The existing cable-actuated hydraulic conversion pump is generally arranged at the front end of the handlebar. On the one hand, the significant exposure of the pump body will affect the overall appearance of the vehicle and increase the risk of damage; on the other hand, the pump body arranged on the vehicle body inevitably causes changes in the routing path of the brake cable and brake hose, as well as exposure of the pipelines, resulting in safety hazards and poorer appearance; after using the cable-actuated hydraulic brake system for a period of time, as the brake pads wear out, the piston inside the brake caliper will require more brake fluid pressure to push forward for braking, and insufficient hydraulic brake pressure will cause brake failure.

In view of above, a cable-actuated hydraulic conversion pump, a handlebar, and a two-wheeled vehicle are provided.

SUMMARY

This application provides a cable-actuated hydraulic conversion pump, a handlebar, and a two-wheeled vehicle to at least solve the problem that the cable-actuated hydraulic conversion pump in the prior art is generally assembled at the front end of the handlebar, which affects the overall appearance of the vehicle and increases the risk of damage. With the wear of the brake pads, the piston inside the brake caliper will require more brake fluid hydraulic pressure to push forward for braking, and insufficient brake fluid hydraulic pressure will cause brake failure.

In the first aspect, the application provides a cable-actuated hydraulic conversion pump, which is used in conjunction with a handlebar, including a pump body, and the pump body is provided with at least one oil cylinder chamber, at least one oil reservoir chamber, a cable-actuated hydraulic brake component, and an oil pressure balancing component.

At least one oil cylinder chamber is provided, the oil cylinder chamber is formed on the pump body and is communicated to an oil outlet in a radial direction.

At least one oil reservoir chamber is provided, the oil reservoir chamber is formed on the pump body and is communicated to the oil cylinder chamber through a communication hole, the oil reservoir chamber and the oil cylinder chamber are filled with brake fluid.

The cable-actuated hydraulic brake component is arranged inside the oil cylinder chamber to drive the brake fluid in the oil cylinder chamber to output from the oil outlet during braking.

The oil pressure balancing component is arranged inside the oil reservoir chamber to replenish brake fluid to the oil cylinder chamber during braking, balancing brake oil pressure.

Optionally, the cable-actuated hydraulic brake component includes a piston rod, a seal ring, a second piston ring, a plug base, an elastic component, an end cover plate, and a brake-cable clamp terminal.

The piston rod is movably arranged inside the oil cylinder chamber, and a hollow bore axially formed in a middle of the piston rod for a brake cable to pass through.

The seal ring is movably sleeved on a first end of the piston rod and is limited and arranged on a stepped portion formed on an inner wall of the oil cylinder chamber.

The second piston ring is radially sleeved on a step section formed in the middle of the piston rod, and an outer wall of the second piston ring abuts against the inner wall of the oil cylinder chamber, a brake fluid chamber is formed between the second piston ring and the seal ring, the brake fluid chamber is communicated to the communication hole and the oil outlet.

The plug base is threaded with a first open end of the oil cylinder chamber and presses to fix an axial position of the seal ring, and a first movable chamber is formed on a middle of the plug base.

One end of the elastic component is limited and arranged in the hollow bore, and an other end extends into the first movable chamber to provide elastic return force after the piston rod moves.

The end cover plate covers a second open end of the oil cylinder chamber to limit a travel starting point of the piston rod, and a second assembly hole is formed on the end cover plate.

A first end of the brake-cable clamp terminal passes through the second assembly hole and is threaded with a second end of the piston rod, and a locking wire screw is arranged on the brake-cable clamp terminal to fix the brake cable.

Optionally, the cable-actuated hydraulic brake component further includes a cable threading sleeve, and a sealing sleeve insert.

The cable threading sleeve is inserted into the plug base for a brake cable to pass through.

The sealing sleeve insert is threaded with one end of the plug base away from the seal ring to fix the cable threading sleeve and seal a first open end of the oil cylinder chamber.

Optionally, the oil pressure balancing component further includes a piston, an oil seal plug, and an oil reservoir cover.

The piston is movably arranged inside the oil reservoir chamber and a fluid replenishment channel is formed and axially penetrates on the piston.

A middle of the oil seal plug has an external threaded section, and the external threaded section is arranged with an internal threaded surface formed on an inner wall of the fluid replenishment channel to seal the fluid replenishment channel.

The oil reservoir cover is fixedly arranged on an open end of the oil reservoir chamber through a screw component, a first assembly hole communicating to an external atmospheric pressure is formed in the oil reservoir cover, a diameter of the first assembly hole is at least larger than a diameter of a head of the oil seal plug.

Optionally, an inner cavity of the fluid replenishment channel is provided with a tapered sealing surface, and a tail of the oil seal plug is formed with a tapered end that cooperates with the tapered sealing surface to seal the fluid replenishment channel.

Optionally, the oil pressure balancing component further includes an oil injection side hole.

The oil injection side hole is formed in the middle of the oil seal plug in a longitudinal direction, a first end of the oil injection side hole penetrates to the head of the oil seal plug, and a second end of the oil injection side hole penetrates to an annular side wall of the oil seal plug near the tapered end.

Optionally, a first piston ring is sleeved on the piston, and the first piston ring is in interference fit with an inner wall surface of the oil reservoir chamber.

Optionally, an assembly part is arranged on the pump body, and screws or rivets are inserted into the assembly part to fix the cable-actuated hydraulic conversion pump to the handlebar.

In a second aspect, the application provides a handlebar, which is provided with at least a handlebar part and a handlebar stem part.

The handlebar stem part is arranged on one side of a middle of the handlebar part, an assembly chamber is formed at a bottom of the handlebar part corresponding to a position of the handlebar stem part, the assembly chamber is provided with an expansion sub-chamber that extends into the handlebar stem part, and the assembly chamber is provided with a cable-actuated hydraulic conversion pump described in the first aspect.

In a third aspect, the application provides a two-wheeled vehicle, which is provided with the a cable-actuated hydraulic conversion pump described in the first aspect.

Compared with related technologies, the cable-actuated hydraulic conversion pump, a handlebar and a two-wheeled vehicle provided by the application at least have the following technical effects:

The cable-actuated hydraulic conversion pump is concealed in a position that does not interfere with the operation of the handlebar and does not create a sudden, obtrusive appearance, it shortens the brake-cable length, reduces its exposure, and can even hide it completely. In addition, when the brake hose is connected, the brake hose can directly enter the frame along the handlebar stem tube, so that the exposed length of the brake hose is shortened or even completely hidden, which integrates the advantages of the cable-actuated disc brake and the hydraulic disc brake, and a smooth braking effect can be achieved with a small braking force. At the same time, by providing an oil pressure balancing component, in the event of brake pads wear during vehicle riding, the brake fluid in the oil reservoir chamber automatically replenishes the oil cylinder chamber where the pressure decreases during the braking process, thereby maintaining sufficient oil in the brake system for braking and ensuring vehicle braking performance.

The details of one or more embodiments of the present application are set forth in the accompanying drawings and the description below. Other features, objectives, and advantages of the present application will be apparent from the following description and drawings.

BRIEF DESCRIPTION OF THE DRAWINGS

In order to illustrate the technical solutions in the specific embodiments of the present invention or in the prior art more clearly, the accompanying drawings required for describing the specific embodiments or the prior art will be briefly introduced below. Obviously, the accompanying drawings in the following description show only some embodiments of the present invention. For those of ordinary skill in the art, other drawings may be derived from these accompanying drawings without creative effort.

Figure 1:
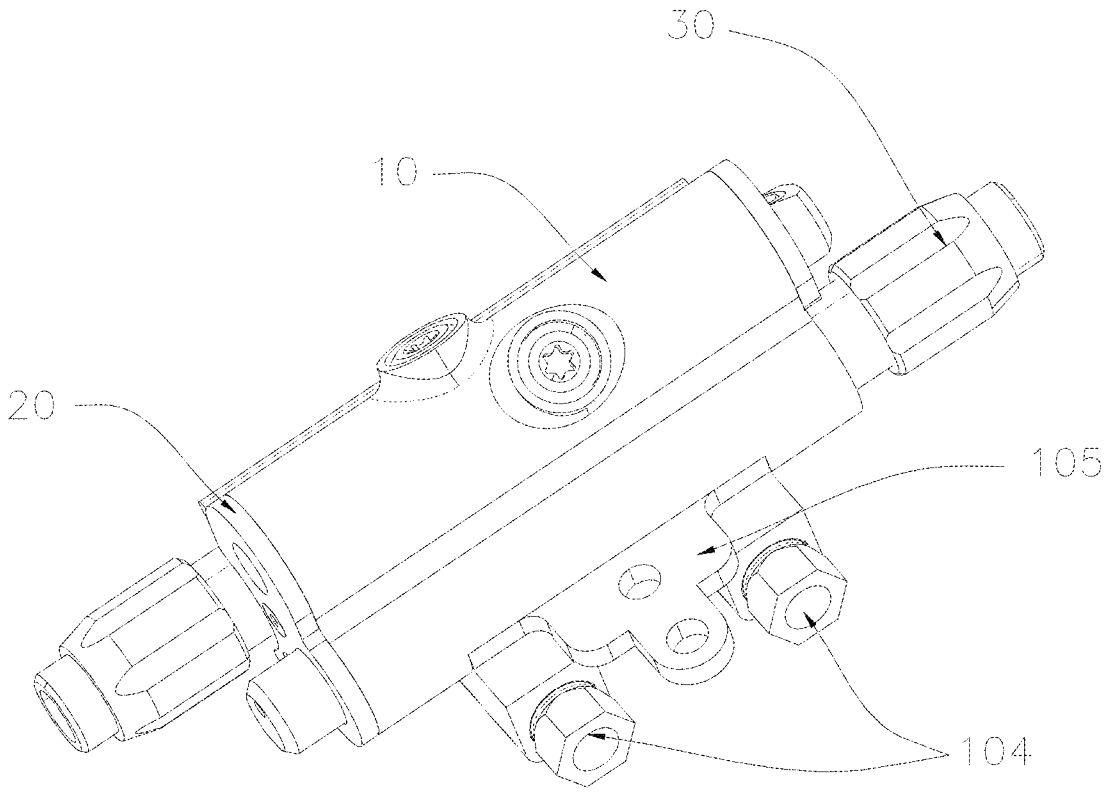
FIG. 1 is a structural schematic diagram of a cable-actuated hydraulic conversion pump according to one embodiment.

Reference numbers in the drawings:

10—pump body: 101—oil cylinder chamber, 102—oil reservoir chamber, 103—communication hole, 104—oil outlet, 105—assembly part;

20—oil pressure balancing component: 201—piston, 2011—first piston ring, 202—fluid replenishment channel, 203—oil seal plug, 2031—tapered end, 204—oil injection side hole, 205—oil reservoir cover, 40351—first assembly hole, 206—screw component;

30—cable-actuated hydraulic brake component: 301—piston rod, 302—second piston ring, 303—end cover plate, 3031—second assembly hole, 304—brake-cable clamp terminal, 305—elastic component, 306—plug base, 307—sealing sleeve insert, 308—cable threading sleeve, 309—seal ring.

DETAILED DESCRIPTION OF THE EMBODIMENT

The technical solutions of the present invention will be described clearly and completely below in conjunction with the accompanying drawings. Obviously, the described embodiments represent only a part of the embodiments of the present invention, rather than all of the embodiments. Based on the embodiments of the present application, all other embodiments obtained by those of ordinary skill in the art without creative effort shall fall within the scope of the present application.

In the description of the present invention, it should be understood that if orientation or position relations indicated by the terms such as "central," "upper," "lower," "left," "right," "vertical," "horizontal," "internal," "external," etc., are based on the orientation or position relations shown in the drawings, and the terms are intended only to facilitate the description of the present invention and simplify the description, rather than indicating or implying that the apparatus or element referred to must have a particular orientation and be constructed and operated in the particular orientation, and therefore cannot be construed as a limitation on the present invention. Furthermore, the terms "first," "second," are merely for the purpose of description, but cannot be understood as indicating or implying relative importance.

In the description of the present application, it should be noted that, unless otherwise explicitly specified and defined, the terms "installed," "connected," and "coupled" shall be understood in a broad sense. For example, a connection may be a fixed connection, a detachable connection, or an integral connection; it may be a mechanical connection, an electrical connection, or a direct connection; it may also be an indirect connection through an intermediate medium. For those of ordinary skill in the art, specific meanings of the above terms in the present invention can be understood according to specific situations.

In related technologies, the key component of the cable-actuated hydraulic disc brake is the cable-actuated hydraulic conversion pump, which is used to convert the cable-actuated force of the cable-actuated brake lever into oil pressure and deliver it to the oil-pressure lower pump. The existing cable-actuated hydraulic conversion pump also has the disadvantages of traditional hydraulic disc brakes, that is, after a period of use, as the brake pads wear out, the piston inside the brake caliper will require more brake fluid pressure to push forward to brake, and insufficient brake fluid pressure will cause brake failure;

At this time, it is necessary to open the oil hole sealed by the oil seal plug to replenish brake fluid into the cylinder chamber. The oil hole is usually formed at the oil reservoir chamber in communication with the cylinder chamber. When the oil hole is opened, air will enter the braking system. However, due to the limitation of the hydraulic circuit, all the air in the braking system may not be exhausted, and the retained air will make the braking failure of the braking system after brake fluid replacement not improved, or even more risky.

Based on the above situation, the embodiments of the present disclosure provide an oil-pressure balancing structure, a cable-actuated hydraulic conversion pump, and a vehicle. The following will be described in detail with specific embodiments and accompanying drawings.

Embodiment 1

The embodiment of the present disclosure provides a cable-actuated hydraulic conversion pump, which is used in conjunction with a handlebar and includes a pump body 10. FIG. 1 is a structural schematic diagram of a cable-actuated hydraulic conversion pump according to an embodiment. Referring to FIG. 1, the pump body 10 of the cable-actuated hydraulic conversion pump is provided with an assembly part 105. Screws or rivets are inserted into the assembly part 105 to fix the cable-actuated hydraulic conversion pump to the handlebar. It can be understood that, referring to FIG. 1, through the cooperation of the assembly part 105 and the screws or rivets, the cable-actuated hydraulic conversion pump can be arranged at any position on the handlebar that does not interfere with the vehicle's riding, such as the front side of the handlebar stem, the lower side of the handlebar cross-bar, etc. Further, fixed components compatible with the assembly part 105 can be replaced on the handlebar to ensure that the pump body 10 is hidden or not abruptly installed on the handlebar, meeting the replacement needs of existing hydraulic disc brakes of road vehicle when assembled on existing handlebars. On the one hand, this reduces the assembly cost, and on the other hand, the manufacturer does not need to redesign the frame or invest in improving production equipment, which reduces production costs.

Figure 2:
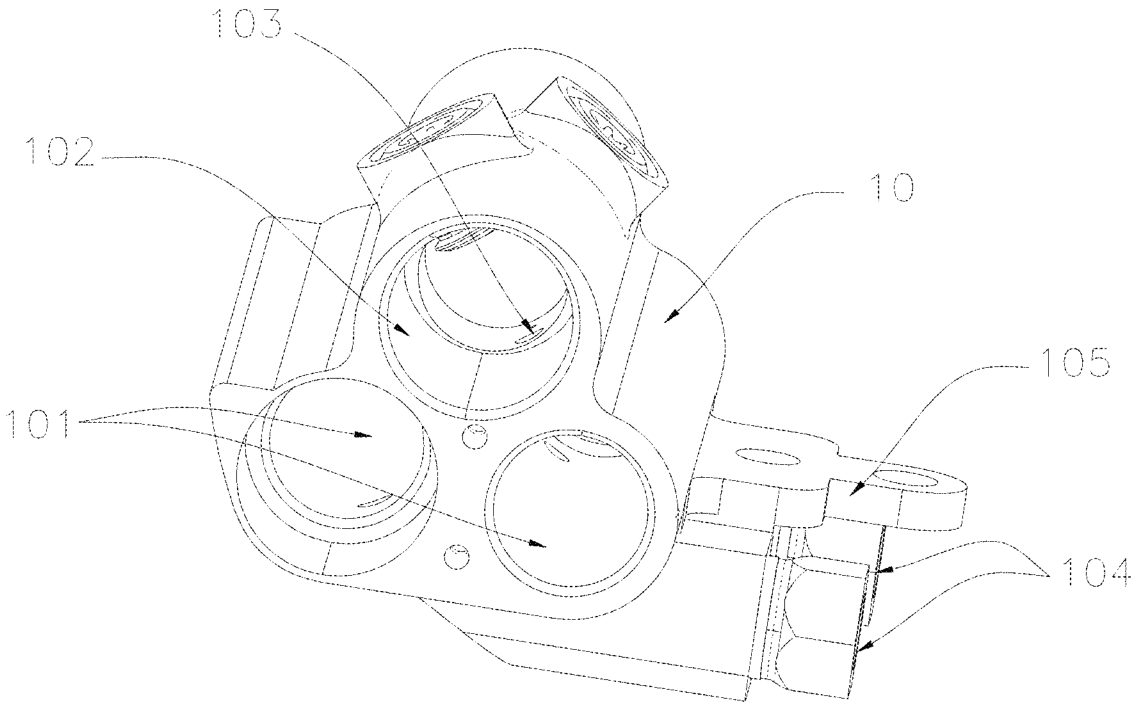
FIG. 2 is a structural schematic diagram of the pump body according to one embodiment.
Figure 3:
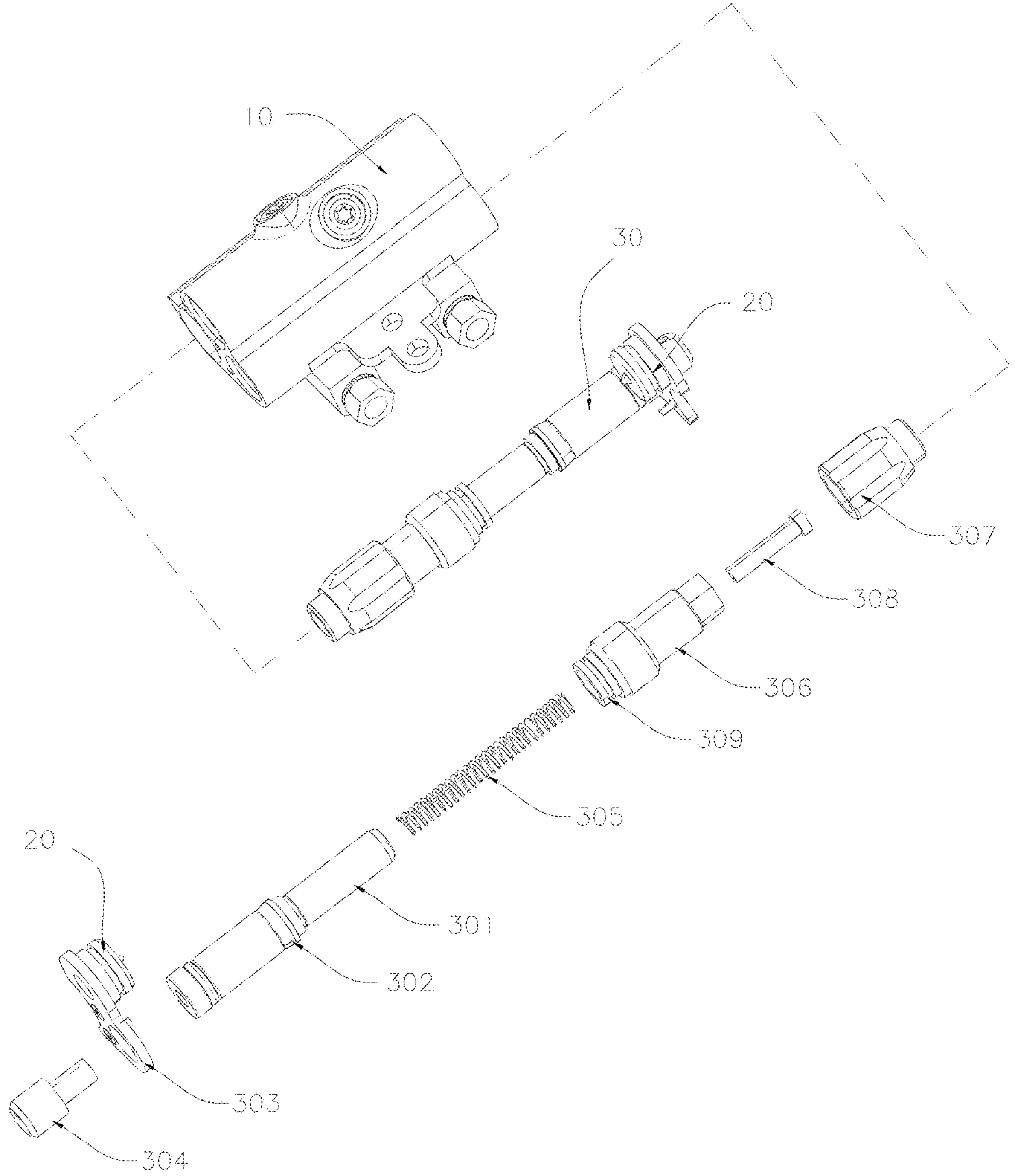
FIG. 3 is an exploded view of the cable-actuated hydraulic conversion pump according to an embodiment.

FIG. 2 is a structural schematic diagram of the pump body according to an embodiment. FIG. 3 is an exploded view of the cable-actuated hydraulic conversion pump according to an embodiment. Referring to FIG. 1 to FIG. 3, the pump body is provided with at least one oil cylinder chamber 101, at least one oil reservoir chamber 102, a cable-actuated hydraulic brake component 30, and an oil pressure balancing component 20.

At least one oil cylinder chamber 101 is provided. The oil cylinder chamber 101 is arranged through the pump body 10 and is communicated to an oil outlet 104 in the upper radial direction. In this embodiment, referring to FIG. 1 to FIG. 2, the number of the oil cylinder chambers 101 is two and arranged in parallel.

At least one oil reservoir chamber 102 is provided. The oil reservoir chamber 102 is arranged on the pump body 10 and is communicated to the oil cylinder chamber 101 through a communication hole 103. The oil reservoir chamber 102 and the oil cylinder chamber 101 are filled with brake fluid which can meet the braking requirements. In this embodiment, referring to FIG. 1 to FIG. 2, the number of the oil reservoir chambers 102 is two. The two oil reservoir chambers 102 are arranged on the same horizontal axis and their open ends are symmetrically distributed. A single oil reservoir chambers 102 is communicated to a single oil cylinder chamber 101 through a corresponding communication hole 103.

The cable-actuated hydraulic brake component 30 is arranged inside the oil cylinder chamber 101 to drive the brake fluid in the oil cylinder chamber 101 to output from the oil outlet 104 during braking. In this embodiment, the number of the oil cylinder chambers 101 is two, and the number of the cable-actuated hydraulic brake components 30 is two, respectively located in the two oil cylinder chambers 101.

The oil pressure balancing component 20 is arranged inside the oil reservoir chamber 102 to replenish brake fluid to the oil cylinder chamber 101 during braking, so as to balance the brake oil pressure.

In the technical solution of the above embodiment, the brake lever, the brake hose, and the brake caliper are used cooperatively when assembly of vehicle. Specifically, the number of the brake levers is two, and the two brake levers are respectively arranged at both ends of the handlebar and connected to the cable-actuated hydraulic brake component 30 through a brake cable to pull the cable-actuated hydraulic brake component 30 to movie in the oil cylinder chamber 101 when the brake lever moves. The number of the brake hoses is two, and the first ends of the two brake hoses are respectively communicated to two oil outlets 104. The number of the brake calipers is two, the two brake calipers are respectively arranged on the front/rear wheels of the bicycle frame, and are cooperate with a brake disc. The two brake calipers are respectively connected to the second ends of two brake hoses to apply hydraulic braking to the brake disc.

Referring to FIG. 1 to FIG. 3, when the brake lever on the one side is pinched, one of the brake cables is pulled to drive the single cable-actuated hydraulic brake component 30 to move axially in the oil cylinder chamber 101 and drive the brake fluid in the oil cylinder chamber 101 to be output through one of the oil outlets 104. Then, the brake fluid enters into the brake caliper at the front/rear wheels through the brake hose, and the brake caliper clamps the brake disc of the front/rear wheels for hydraulic braking, so that the hydraulic circuit is smooth and the braking is stable.

When the brake lever on the other side is pinched, another brake cable is pulled to drive the single cable-actuated hydraulic brake component 30 to move axially in the oil cylinder chamber 101 and drive the brake fluid in the oil cylinder chamber 101 to be output through another oil outlet 104. The same principle and process as above, then the brake fluid enters the brake caliper at the front/rear wheel through the brake hose, and the brake caliper clamps the brake disc of the front/rear wheel for hydraulic braking, so that the hydraulic circuit is smooth and the braking is stable.

Continuing to refer to FIG. 1 to FIG. 3, in this embodiment, the cable-actuated hydraulic brake component 30 is arranged inside the oil cylinder chamber 101 and includes a piston rod 301, a seal ring 309, a second piston ring 302, a plug base 306, an elastic component 305, an end cover plate 303, and a brake-cable clamp terminal 304.

The piston rod 301 is movably arranged inside the oil cylinder chamber 101, and a hollow bore axially formed in the middle of the piston rod 301 for a brake cable to pass through.

The seal ring 309 is movably sleeved on the first end of the piston rod 301 and is limited and arranged on the stepped portion formed on the inner wall of the oil cylinder chamber 101;

The second piston ring 302 is radially sleeved on the step section formed in the middle of the piston rod 301, and an outer wall of the second piston ring 302 abuts against the inner wall of the oil cylinder chamber 101. A brake fluid chamber is formed between the second piston ring 302 and the seal ring 309, which is communicated to the communication hole 103 and the oil outlets 104.

The plug base 306 is threaded with the first open end of the oil cylinder chamber 101 and presses to fix the axial position of the seal ring 309, and a first movable chamber is formed on the middle of the plug base 306.

One end of the elastic component 305 is limited and arranged in the hollow bore, and the other end extends into the first movable chamber to provide elastic return force after the piston rod 301 moves.

Figure 4:
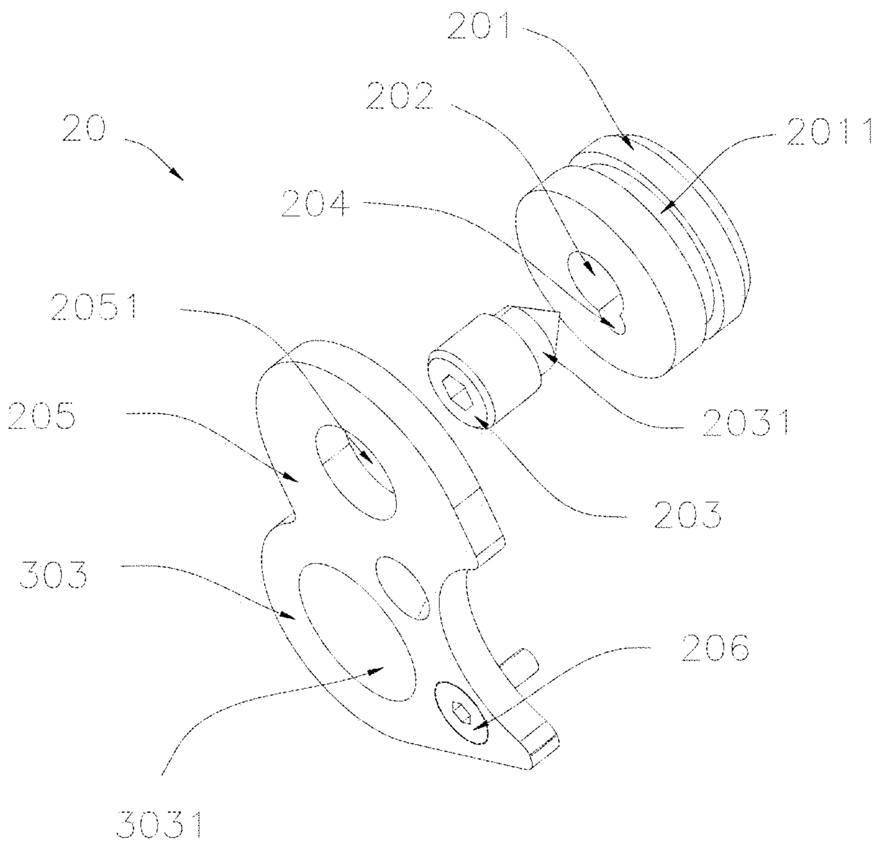
FIG. 4 is an exploded view of an oil pressure balancing component according to an embodiment.

The end cover plate 303 covers the second open end of the oil cylinder chamber 101 to limit the travel starting point of the piston rod 301, and a second assembly hole 3031 is formed on the end cover plate 303. Referring to FIG. 4, the end cover plate 303 and the oil reservoir cover 205 are integrally formed, saving parts and reducing assembly processes.

The first end of the brake-cable clamp terminal 304 passes through the second assembly hole 3031 and is threaded with the second end of the piston rod 301, and a locking wire screw is arranged on the brake-cable clamp terminal 304 to fix the brake cable.

Continuing to refer to FIG. 3, in this embodiment, the cable-actuated hydraulic brake component 30 further includes a cable threading sleeve 308, and a sealing sleeve insert 307.

The cable threading sleeve 308 is inserted into the plug base 306 for a brake cable to pass through;

The sealing sleeve insert 307 is threaded with one end of the plug base 306 away from the seal ring 309 to fix the cable threading sleeve 308 and seal the first open end of the oil cylinder chamber 101.

In the technical solution of the above embodiment, a single cable-actuated hydraulic brake component 30 is used in conjunction with a brake lever and a oil-pressure lower pump during assembly. Specifically, the first end of the brake cable is connected to the brake lever, and the second end passes through the hollow bore of the cable-actuated hydraulic brake component 30 and is fixed to brake-cable clamp terminal 304 through a locking wire screw. The first end of the brake hose is connected to the oil outlet 104 through a brake hose joint, and the second end is connected to the oil-pressure lower pump arranged at the front/rear wheels of the bicycle frame.

When the brake lever is pinched, the piston rod 301 moves axially in the oil cylinder chamber 101 under the traction of the brake cable, and the brake fluid in the brake fluid chamber is driven by the second piston ring 302 to be output through the oil outlet 104, and then enters into the oil-pressure lower pump at the front/rear wheels through the brake hose, and the oil-pressure lower pump clamps the brake disc of the front/rear wheels for hydraulic braking, so that the hydraulic circuit is smooth and the braking is stable.

FIG. 4 is an exploded view of an oil pressure balancing component according to one embodiment. Referring to FIG. 1 to FIG. 4, in this embodiment, an oil pressure balancing component is arranged in the oil reservoir chamber 102, and includes a piston 201, an oil seal plug 203, an oil reservoir cover 205, and an oil injection side hole 204.

The piston 201 is movably arranged inside the oil reservoir chamber 102 and an axially penetrating fluid replenishment channel 202 is formed on the piston 201. A first piston ring 2011 is sleeved on the piston 201, and the first piston ring 2011 is in interference fit with the inner wall surface of the oil reservoir chamber 102.

The middle of the oil seal plug 203 has an external threaded section, and the external threaded section is threaded with an internal threaded surface formed on the inner wall of the fluid replenishment channel 202 to seal the fluid replenishment channel 202. The inner cavity of the fluid replenishment channel 202 is provided with a tapered sealing surface, and the tail of the oil seal plug 203 is formed with a tapered end 2031 that cooperates with the tapered sealing surface to seal the fluid replenishment channel 202.

The oil reservoir cover 205 is fixedly arranged on the open end of the oil reservoir chamber 102 through a screw component 206, and a first assembly hole 2051 communicating to the external atmospheric pressure is formed in the oil reservoir cover 205. It can be understood that the diameter of the first assembly hole 2051 is at least larger than the diameter of the head of the oil seal plug 203. Preferably, the inner cavity space of the first assembly hole 2051 extends to the oil injection side hole 204, making it easy for the output port of the oil injection tool to enter, thereby facilitating the brake fluid replenishment operation.

The oil injection side hole 204 is formed in the middle of the oil seal plug 203 in the longitudinal direction, the first end of the oil injection side hole 204 penetrates to the head of the oil seal plug, and the second end of the oil injection side hole 204 penetrates to the annular side wall of the oil seal plug 203 near the tapered end 2031.

In the technical solution of the above embodiment, referring to FIG. 1 to FIGS. 2 and 4, in the initial state, the piston 201 is on the side near the open end of the oil reservoir chamber 102 in the oil reservoir chamber 102 and its travel is limited by the oil reservoir cover 205. As the brake pads wear, during the braking process, the brake fluid in the oil reservoir chamber 102 automatically replenishes the cylinder chamber 101 where the pressure decreases, and the piston 201 moves in the direction of the brake fluid output, thereby maintaining sufficient oil volume in the brake system for braking.

When brake fluid needs to be replenished in the pump body 10, the output port of the oil injection tool is inserted into the oil injection side hole 204, and a small amount of brake fluid is injected in advance to discharge the residual air in the oil injection side hole 204 and the fluid replenishment channel 202. Then the head of the oil seal plug 203 is unscrewed by a tool along the thread direction to slightly loosen a certain stroke, and an annular fluid inlet channel is formed between the tapered end 2031 and the tapered sealing surface. The fluid inlet channel is communicated to the second end of the oil injection side hole 204. At this time, the injected brake fluid can directly enter the oil reservoir chamber 102, and air will not enter the brake system, thus realizing rapid brake fluid replenishment and ensuring the braking performance of the vehicle.

Meanwhile, it can be understood that at this time, the oil seal plug 203 is sleeved with a seal ring 409, and the seal ring 409 is still in a sealed fit with the inner wall surface of the fluid replenishment channel 202, avoiding brake fluid leakage during the fluid replenishment state.

It can be understood that in long-term use, as the brake pads wear out, the brake fluid in the oil reservoir chamber 102 can be automatically replenished to the oil cylinder chamber 101 where the pressure decreases, and an expansion allowance will gradually form between the piston 201 and the oil reservoir cover 205. During braking, the brake fluid will be heated and expanded by conducting the heat of the brake pads, and the brake fluid with expanded volume can enter the oil reservoir chamber 102 through the communication hole 103 in the oil cylinder chamber 101, achieving pressure balance and avoiding the risk of brake disc lock-up, maintaining and optimizing the smooth braking effect of hydraulic disc braking. At this time, the brake fluid entering the oil reservoir chamber 102 will push the piston 201 to move to the side of the oil reservoir cover 205 in the oil reservoir chamber 102 to accommodate the the expanded volume of the brake fluid. When the temperature of the brake fluid is lowered, the volume of the brake fluid is reduced, the brake fluid automatically flows back to the oil cylinder chamber 101 where the pressure decreases, and the piston 201 further gradually returns to its original position with the backflow of the brake fluid under the action of external atmospheric pressure.

It can be further understood that during vehicle mounting, a certain expansion allowance can be directly formed between the piston 201 and the oil reservoir cover 205 to directly accommodate the volume of brake fluid that needs to be expanded.

In summary, the embodiment of the present disclosure provides a cable-actuated hydraulic conversion pump. The cable-actuated hydraulic conversion pump is installed in a position that does not interfere with the operation of the brake lever and does not create a sudden, obtrusive appearance, and the length of the brake cable is shortened and avoided from being exposed. The brake cable can further penetrate through the handlebar horizontal tube to hide the brake cable. When the brake hose is connected, the brake hose can directly enter the frame along the handlebar stem tube, so that the exposed length of the brake hose is shortened or even completely hidden, which integrates the advantages of the cable-actuated disc brake and the hydraulic disc brake, and a smooth braking effect can be achieved with a small braking force. At the same time, providing an oil pressure balancing component, in the event of brake pads wear during vehicle riding, the brake fluid in the oil reservoir chamber 102 automatically replenishes the oil cylinder chamber 101 where the pressure decreases during the braking process, thereby maintaining sufficient oil in the brake system for braking and ensuring vehicle braking performance.

Embodiment 2

Figure 5:
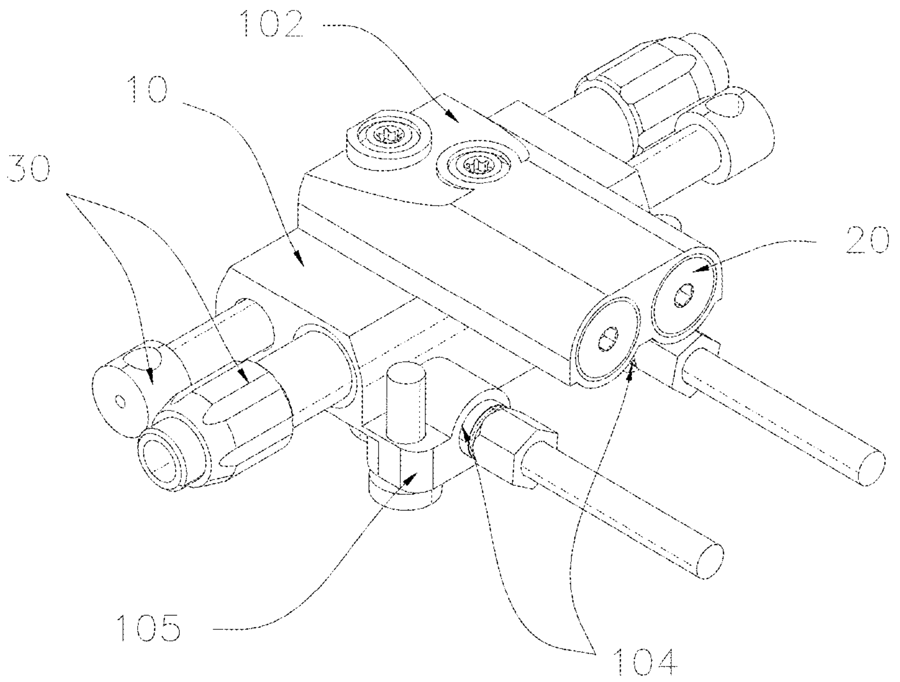
FIG. 5 is a structural schematic diagram of a cable-actuated hydraulic conversion pump according to another embodiment.

The embodiment 2 of the present application provides a cable-actuated hydraulic conversion pump, which is used in conjunction with a handlebar and includes a pump body 10. FIG. 5 is a structural schematic diagram of a cable-actuated hydraulic conversion pump according to another embodiment. The difference between the embodiment 2 and the embodiment 1 is that the number of the oil reservoir chambers 102 is two, and the two oil reservoir chambers 102 are formed on the same horizontal axis with the open ends distributed in the same direction and arranged vertically with respect to the oil cylinder chamber 101, and a single oil reservoir chambers 102 is communicated to a single oil cylinder chamber 101 through a corresponding communication hole 103.

Other structures not described refer to the embodiment 1.

Figure 6:
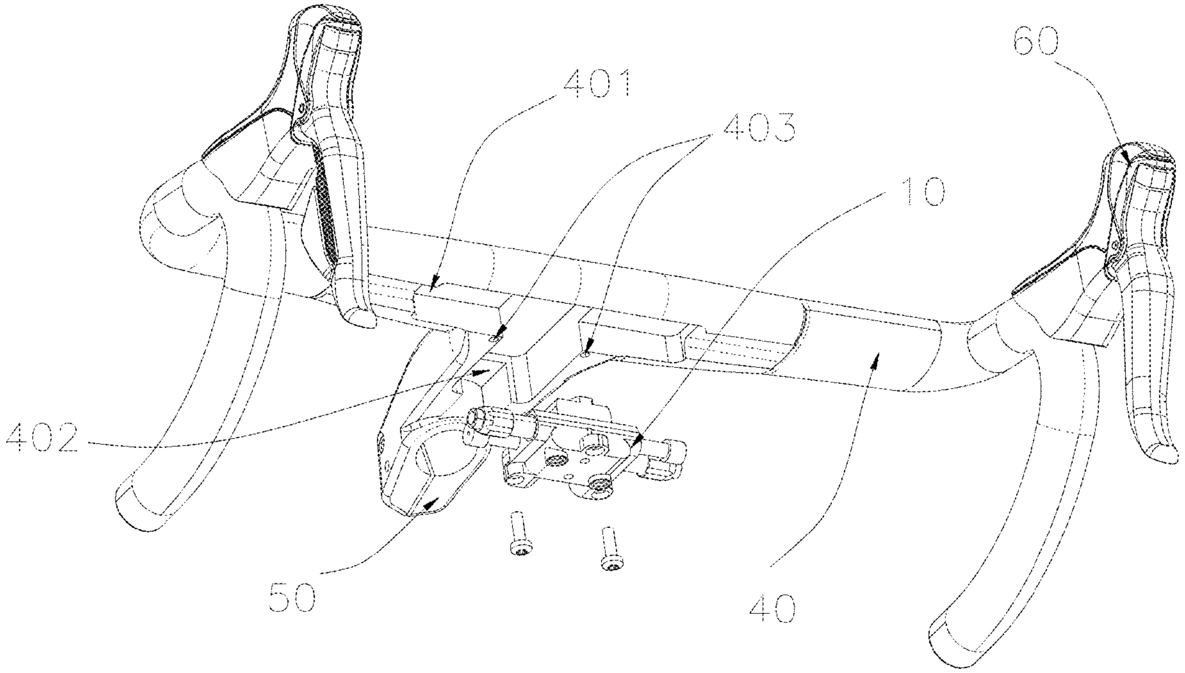
FIG. 6 is an assembly diagram of the cable-actuated hydraulic conversion pump and a handlebar according to another embodiment.

Further, the embodiment 2 of the present application further provides a handlebar, and FIG. 6 is an assembly diagram of the cable-actuated hydraulic conversion pump and a handlebar according to another embodiment. The handlebar is at least provided with a handlebar horizontal part 40 and a handlebar stem part 50. The handlebar further includes brake levers 60, and the brake levers 60 are respectively fixed to the two free ends of the handlebar horizontal part 40 and connected to a brake cable. In this embodiment, a hollow bore for the brake cable to pass through internally is arranged inside the handlebar horizontal part 40, and the hollow bore is connected to the assembly chamber 401. The other end of the brake cable is routed internally along the handlebar and is connected to the driving end of the pump body 10. The handlebar horizontal part 40 is of a cylindrical structure or a tubular structure generally, which can hide the brake cable and prevent the brake cable from being exposed out of the vehicle. On the one hand, it ensures a cleaner and more beautiful appearance of the frame, on the other hand, the absence of exposed brake cable can also protect the brake cable and avoid accidental damage.

In cooperation with the arrangement the assembly part 105, at least one assembly hole 403 is arranged at the bottom end of the handlebar horizontal part 40 to fix the pump body 10 with screws or rivets, so as to conveniently assemble the cable-actuated hydraulic conversion pump in the embodiment 2 of the present application.

The handlebar stem part 50 is arranged on one side of the middle of the handlebar horizontal part 40, and an assembly chamber 401 is formed at the bottom of the handlebar horizontal part 40 corresponding to the position of the handlebar stem part 50. The assembly chamber 401 is provided with an expansion sub-chamber 402 that extends into the handlebar stem part 50, and the assembly chamber 401 is provided with the cable-actuated hydraulic conversion pump of the embodiment 2;

Continuing to refer to FIG. 6, the assembly chamber 401 combined with the expansion sub-chamber 402 forms a T-shaped structure, and the oil outlet 104 is arranged towards the expansion sub-chamber 402. It can be understood that when the oil outlet 104 is provided with a direct outward extending tube, and the outward extending tube extends into the expansion sub-chamber 402. A brake hose terminal for brake hose assembly is connected to the oil outlet 104, and the first end of the brake hose extends into the expansion sub-chamber 402.

One end of the handlebar stem 50 facing away from the handlebar horizontal part 40 is provided with a handlebar stem hole 501 for the assembly of the fork steerer tube, and an access port for the brake hose to pass through internally is formed on the fork steerer tube.

In the technical solution of the above embodiment, the pump body 10 is arranged in the assembly chamber 401 formed in the middle of the bottom end of the handlebar horizontal part 40, which can achieve hidden assembly of the pump body 10. Further, the oil outlet 104 is arranged towards the expansion sub-chamber 402, and the oil outlet 104 and the brake hose joint can be accommodated and hidden through the expansion sub-chamber 402 of the assembly chamber 401, avoiding the brake hose from being exposed. The brake hose penetrates into the handlebar stem hole 501 through the access port and is routed internally, so that the brake hose line is prevented from being exposed, and the whole vehicle is more beautiful.

Further, the front section of the brake hose can be hidden and covered by the expansion sub-chamber 402, and then inserted into the frame through the access port of the fork steerer tube to hide the brake hose, so that the whole vehicle does not expose the brake hose, which is more neat and beautiful, and can effectively protect the brake hose.

Embodiment 3

Figure 7:
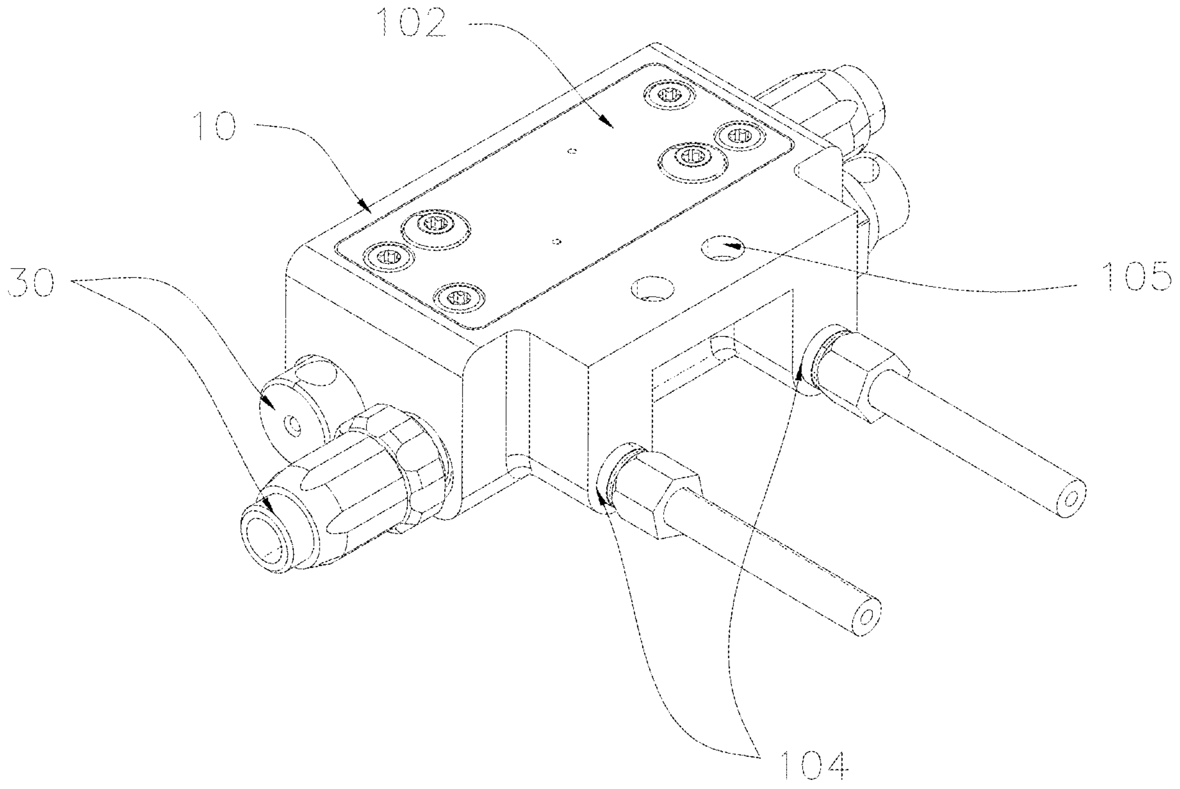
FIG. 7 is a structural schematic diagram of a cable-actuated hydraulic conversion pump according to the another embodiment.

The embodiment 3 of the present application provides a cable-actuated hydraulic conversion pump, which is used in conjunction with a handlebar and includes a pump body 10. FIG. 7 is a structural schematic diagram of a cable-actuated hydraulic conversion pump according to the embodiment 3. The difference between the embodiment 3 and embodiments 1-2 is that the number of the oil reservoir chambers 102 is one, the oil reservoir chamber 102 is formed on one side of the two oil cylinder chambers 101, and the single oil reservoir chamber 102 is communicated to the two oil cylinder chambers 101 through two communication holes 103. That is to say, a single oil reservoir chamber 102 replenishes oil for two oil cylinder chambers 101. In this embodiment 3, the pump body 10 is of a rectangular structure, featuring a more regular appearance.

Other structures not described refer to the embodiment 1.

Figure 8:
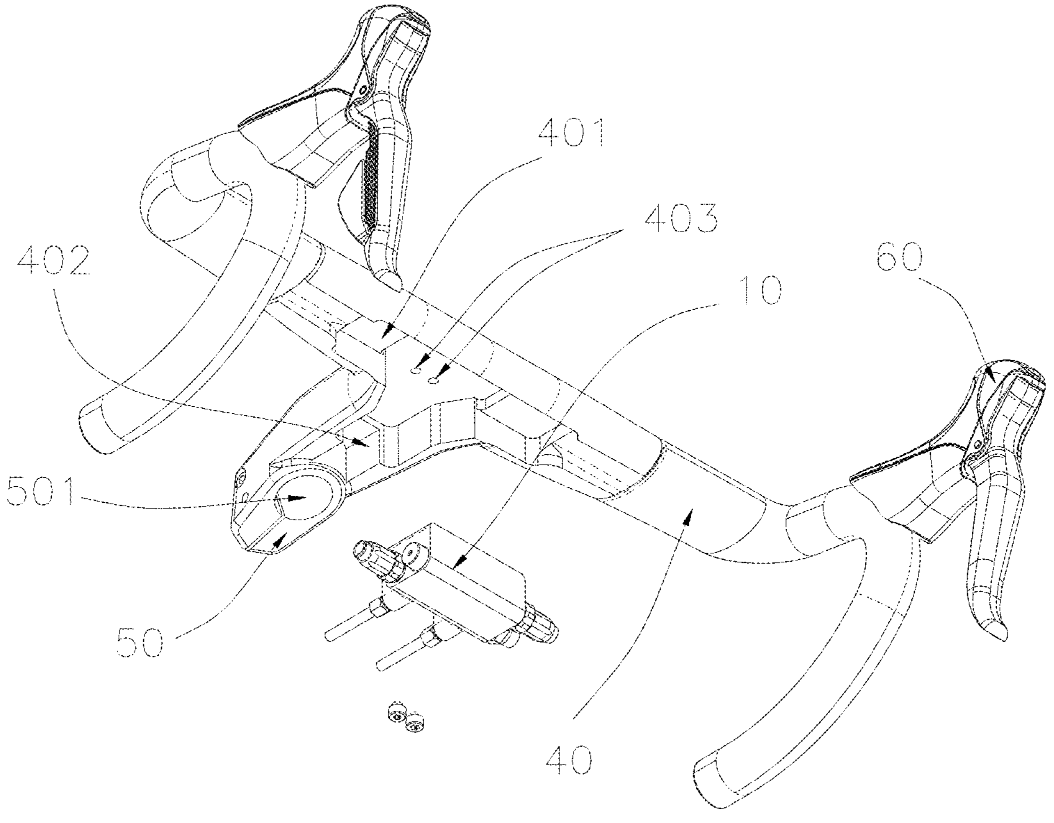
FIG. 8 is an assembly diagram of a cable-actuated hydraulic conversion pump and a handlebar according to another embodiment.

Further, the embodiment 3 of the present application further provides a handlebar, and FIG. 8 is an assembly diagram of a cable-actuated hydraulic conversion pump and a handlebar according to the embodiment 3. The handlebar is at least provided with a handlebar horizontal part 40 and a handlebar stem 50.

The handlebar stem 50 is arranged on one side of the middle of the handlebar horizontal part 40, and an assembly chamber 401 is formed at the bottom of the handlebar horizontal part 40 corresponding to the position of the handlebar stem 50. The assembly chamber 401 has an expansion sub-chamber 402 that extends into the handlebar stem part 50, and the assembly chamber 401 is provided with the cable-actuated hydraulic conversion pump of the embodiment 2. As shown in FIG. 7 to FIG. 8, in this embodiment, the assembly chamber 401 combined with the expansion sub-chamber 402 forms a nearly rectangular structure, and the oil outlet 104 is arranged towards the expansion sub-chamber 402. It can be understood that when the oil outlet 104 has a direct outward extending tube, its outward extending tube also extends and arranges into the expansion support chamber 402. The oil pipe terminal for oil pipe assembly is connected to the oil outlet 104, and extend the first end of the oil pipe into the expansion support chamber 402.

It can be understood that when the oil outlet 104 is provided with a direct outward extending tube, and the outward extending tube extends into the expansion sub-chamber 402. A brake hose terminal for brake hose assembly is connected to the oil outlet 104, and the first end of the brake hose extends into the expansion sub-chamber 402.

In cooperation with the arrangement the assembly part 105, at least one assembly hole 403 is arranged at the bottom end of the handlebar horizontal part 40 to fix the pump body 10 with screws or rivets, so as to conveniently assemble the cable-actuated hydraulic conversion pump in the embodiment 2 of the present application.

In the technical solution of the above embodiment, the assembly chamber 401 and the expansion sub-chamber 402 with a nearly rectangular structure can fully adapt to different shapes of the cable-actuated hydraulic conversion pumps, so that the shortest path of the brake hose connecting to the oil outlet 104 is a better choice, which can reduce the exposure of the brake hose at the bottom end of the integrated handlebar as much as possible and keep the appearance.

Other structures not described refer to the embodiment 2.

Embodiment 4

The embodiment 4 of the present application provides a two-wheeled vehicle, which has the cable-actuated hydraulic conversion pump of any one of Embodiments 1-3.

Meanwhile, it can be understood that the embodiments of this application only lists the typical shape of the assembly chamber 401, and its shape is not limited to T-shape or strip shape. And the assembly chamber 401 is not limited to the handlebars of two-wheeled bicycles, but can also be applied to frames with handlebars such as electric two-wheeled bicycles and scooters.

In summary, the embodiments of the present disclosure provide a cable-actuated hydraulic conversion pump, a handlebar, and a two-wheeled vehicle. The cable-actuated hydraulic conversion pump is concealed in a position that does not interfere with the operation of the handlebar and does not create a sudden, obtrusive appearance, it shortens the brake-cable length, reduces its exposure, and can even hide it completely. When the brake hose is connected, the brake hose can directly enter the frame along the handlebar stem tube, so that the exposed length of the brake hose is shortened or even completely hidden, which integrates the advantages of the cable-actuated disc brake and the hydraulic disc brake, and a smooth braking effect can be achieved with a small braking force; at the same time, providing an oil pressure balancing component 20, in the event of brake pads wear during vehicle riding, the brake fluid in the oil reservoir chamber 102 automatically replenishes the oil cylinder chamber 101 where the pressure decreases during the braking process, thereby maintaining sufficient oil in the brake system for braking and ensuring vehicle braking performance.

The technical features of the above embodiments may be combined in any manner. For brevity, not all possible combinations of the technical features in the above embodiments have been described. However, any combination of these technical features is encompassed within the scope of this disclosure, provided it is technically feasible and absent contradiction.

The foregoing embodiments only express several implementation modes of the present application, and the description thereof is relatively specific and detailed, but the present invention is not limited thereto. It should be noted that for those of ordinary skill in the art, numerous modifications and variations may be made without departing from the spirit of the present application, and these all fall within the scope of protection of the present invention. Therefore, the protection scope of the patent of the present application shall be subject to the appended claims.

What is claimed is:

1. A cable-actuated hydraulic conversion pump, which is used in conjunction with a handlebar, comprising a pump body, and the pump body is provided with at least one oil cylinder chamber, at least one oil reservoir chamber, a cable-actuated hydraulic brake component, and an oil pressure balancing component;

wherein the oil cylinder chamber is formed on the pump body and is communicated to an oil outlet in a radial direction;

the oil reservoir chamber is formed on the pump body and is communicated to the oil cylinder chamber through a communication hole, and the oil reservoir chamber and the oil cylinder chamber are filled with brake fluid;

the cable-actuated hydraulic brake component is arranged inside the oil cylinder chamber to drive the brake fluid in the oil cylinder chamber to output from the oil outlet during braking;

the oil pressure balancing component is arranged inside the oil reservoir chamber to replenish brake fluid to the oil cylinder chamber during braking to balance brake oil pressure;

wherein the cable-actuated hydraulic brake component comprises a piston rod, a seal ring, a second piston ring, a plug base, an elastic component, an end cover plate, and a brake-cable clamp terminal;

the piston rod is movably arranged inside the oil cylinder chamber, and a hollow bore is axially formed in a middle of the piston rod for a brake cable to pass through;

the seal ring is movably sleeved on a first end of the piston rod and is limited and arranged on a stepped portion formed on an inner wall of the oil cylinder chamber;

the second piston ring is radially sleeved on a step section formed in the middle of the piston rod, and an outer wall of the second piston ring abuts against the inner wall of the oil cylinder chamber, a brake fluid chamber is formed between the second piston ring and the seal ring, and the brake fluid chamber is communicated to the communication hole and the oil outlet;

the plug base is threaded with a first open end of the oil cylinder chamber and presses to fix an axial position of the seal ring, and a first movable chamber is formed on a middle of the plug base;

one end of the elastic component is limited and arranged in the hollow bore, and an other end extends into the first movable chamber to provide elastic return force after the piston rod moves;

the end cover plate covers a second open end of the oil cylinder chamber to limit a travel starting point of the piston rod, and a second assembly hole is formed on the end cover plate;

a first end of the brake-cable clamp terminal passes through the second assembly hole and is threaded with a second end of the piston rod, and a locking wire screw is arranged on the brake-cable clamp terminal to fix the brake cable.

2. The cable-actuated hydraulic conversion pump according to claim 1, wherein the cable-actuated hydraulic brake component further comprises a cable threading sleeve, and a sealing sleeve insert;

the cable threading sleeve is inserted into the plug base for a brake cable to pass through; and the sealing sleeve insert is threaded with one end of the plug base away from the seal ring to fix the cable threading sleeve and seal a first open end of the oil cylinder chamber.

3. The cable-actuated hydraulic conversion pump according to claim 1, wherein the oil pressure balancing component further comprises a piston, an oil seal plug, and an oil reservoir cover;

the piston is movably arranged inside the oil reservoir chamber, and a fluid replenishment channel is formed and axially penetrates on the piston;

a middle of the oil seal plug has an external threaded section, and the external threaded section is assembled with an internal threaded surface formed on an inner wall of the fluid replenishment channel to seal the fluid replenishment channel; and the oil reservoir cover is fixedly arranged on an open end of the oil reservoir chamber through a screw component, a first assembly hole communicating to an external atmospheric pressure is formed in the oil reservoir cover, and a diameter of the first assembly hole is at least larger than a diameter of a head of the oil seal plug.

4. The cable-actuated hydraulic conversion pump according to claim 3, wherein an inner cavity of the fluid replenishment channel is provided with a tapered sealing surface, and a tail of the oil seal plug is formed with a tapered end that cooperates with the tapered sealing surface to seal the fluid replenishment channel.

5. The cable-actuated hydraulic conversion pump according to claim 4, wherein the oil pressure balancing component further comprises an oil injection side hole;

the oil injection side hole is formed in the middle of the oil seal plug in a longitudinal direction, a first end of the oil injection side hole penetrates to the head of the oil seal plug, and a second end of the oil injection side hole penetrates to an annular side wall of the oil seal plug near the tapered end.

6. The cable-actuated hydraulic conversion pump according to claim 3, wherein a first piston ring is sleeved on the piston, and the first piston ring is in interference fit with an inner wall surface of the oil reservoir chamber.

7. The cable-actuated hydraulic conversion pump according to claim 1, wherein an assembly part is arranged on the pump body, and the assembly part is configured to fix the cable-actuated hydraulic conversion pump to the handlebar through screws or rivets.

8. A handlebar, wherein the handlebar is provided with at least a handlebar part and a handlebar stem part;

the handlebar stem part is arranged on one side of a middle of the handlebar part, an assembly chamber is formed at a bottom of the handlebar part corresponding to a position of the handlebar stem part, the assembly chamber is provided with an expansion sub-chamber that extends into the handlebar stem part, and the assembly chamber is provided with the cable-actuated hydraulic conversion pump of as claimed in claim 1.

9. A two-wheeled vehicle, wherein the two-wheeled vehicle is provided with the cable-actuated hydraulic conversion pump as claimed in claim 1.

* * * * *